March 6, 1934.    W. T. BARKER, JR    1,950,339
MOLD CHARGE GUIDING MEANS FOR GLASS FEEDING APPARATUS.
Filed Oct. 17, 1931    2 Sheets-Sheet 1

Witness:
A. A. Horn

Inventor
Wm. T. Barker, Jr.
by Brown & Parham
Attorneys.

March 6, 1934.  W. T. BARKER, JR  1,950,339
MOLD CHARGE GUIDING MEANS FOR GLASS FEEDING APPARATUS
Filed Oct. 17, 1931  2 Sheets-Sheet 2
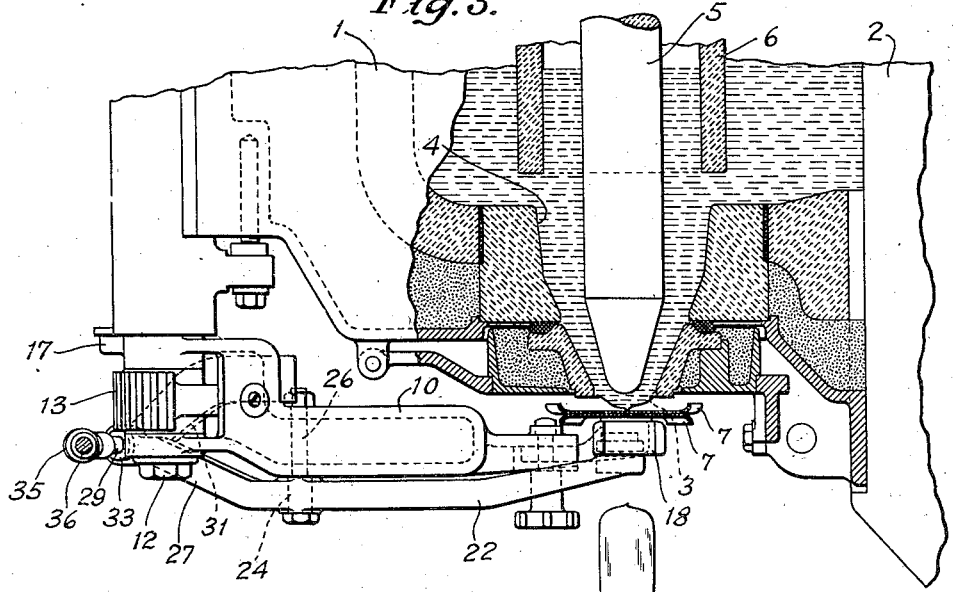
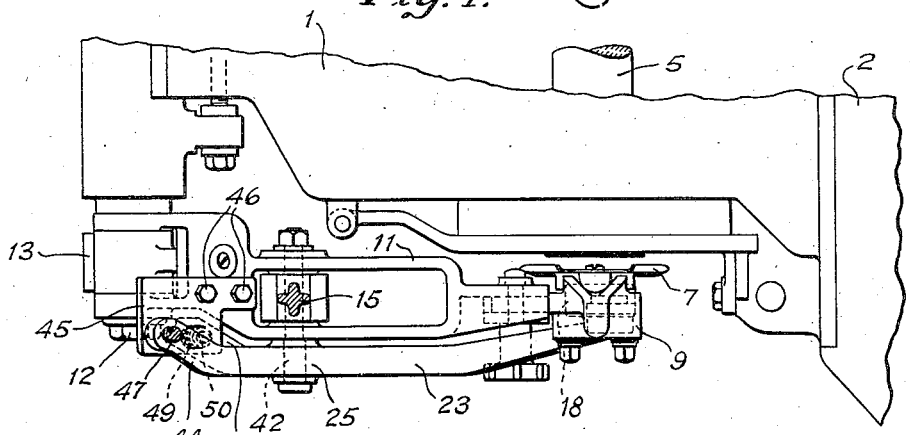
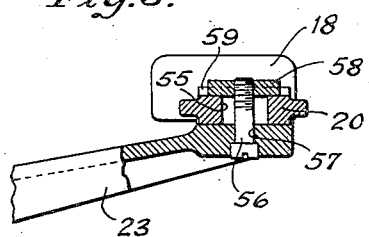
Inventor
Wm. T. Barker, Jr.
by Brown & Parham
Attorneys.
Witness:
A. A. Horn.

Patented Mar. 6, 1934

1,950,339

UNITED STATES PATENT OFFICE 1,950,339

MOLD CHARGE GUIDING MEANS FOR GLASS FEEDING APPARATUS

William T. Barker, Jr., West Hartford, Conn., assignor to Hartford-Empire Company, Hartford, Conn., a corporation of Delaware Application October 17, 1931, Serial No. 569,450

10 Claims. (Cl. 49—14)

This invention relates generally to apparatus for feeding molten glass in "suspended" mold charges and more particularly to means for steadying and guiding the charges when they are being severed by the severing mechanism of a glass feeder and at the time the severed charges start to fall downwardly toward a mold or a charge delivery device.

It is now recognized in the art to which the present invention appertains that it is desirable to use some means for steadying and guiding mold charges during and after their severance by shearing mechanism of glass feeding apparatus. It is usual in glass feeding apparatus to employ a pair of overlapping shear blades which are closed to sever the suspended charges at a plane spaced below the outlet of a forehearth or other container of such glass feeding apparatus. The closing movement of the lower of the overlapping shear blades as it severs a suspended charge from the glass that has issued from the outlet tends to impart a lateral motion to the upper portion of the charge at the instant of its severance from the glass above the severing plane. Unless this tendency is overcome, as by the use of means for steadying and guiding the charge at the time and immediately after its severance, the severed mold charge may be displaced by the action of the lowermost shear blade so that it would not fall centrally into an underlying mold or be delivered properly to a delivery chute or other delivery device.

It also is desirable that the means for steadying and guiding the charges during their severance be mounted for movement with the overlapping shear blades. One advantage of this arrangement is that adjustments of the shear blades with respect to the outlet may be effected without requiring independent adjustments of the means for guiding and steadying the charges. Also, the charge-guiding and steadying means, if moving with the shear blades, will be periodically retracted from proximity to the glass in the intervals between successive severing operations, thereby permitting such means to be cooled and tending to prevent undue heating thereof.

It has been proposed prior to the present invention to mount a pair of cooperative charge-guiding members on the holders for the shear blades for movement with the latter to and from position to contact with opposite sides of each charge when formed and while it is being severed so as to prevent "batting" of the charge and for guiding the latter immediately after its severance. Such guiding members have been removable to permit the use of members adapted for contact with charges of different sizes in cross section. However, with such prior construction, it has been necessary to stop the glass feeding operation and to put the shearing mechanism temporarily out of use during the interchange of charge-guiding members.

It also has been proposed, prior to the present invention, to mount a single charge-guiding member on the holder for the uppermost of two overlapping shear blades for movement therewith so that such charge-guiding member will oppose the displacing or "batting" tendency of the lower shear blade. A charge guide of this type of construction is shown in Fig. 19 of Patent No. 1,760,435, granted May 27, 1930, to Karl E. Peiler, as assignor to the Hartford-Empire Company, and is described and claimed in such patent. A charge-guide of this type of construction is mounted to permit adjustment thereof with respect to the cutting edge of the associate shear blade so that it may be brought by the closing movement of such shear blade to any one of a plurality of different distances from the extended axial or center line of the glass feeding outlet. The charge-guide thus may be adjusted to function in the manner intended when charges of any one of a plurality of different sizes in cross section or diameters are being severed. However, such adjustment of the charge-guide is difficult, if not practically impossible of accomplishment, during the continued operation of the feeder and of the shear mechanism, because the charge-guide support and adjusting mechanism is carried by the holder for the shear blade in a heated environment adjacent to the hot glass from which the successive charges are being severed. Moreover, such adjusting mechanism is moved rapidly back and forth with the associate shear blade holder and access thereto for manual adjustment is difficult because of the proximity of parts of the glass severing mechanism and other indispensable parts of the glass feeding apparatus.

An object of the present invention, therefore, is to improve glass feeding apparatus by providing means for steadying and guiding the mold charges as they are severed, which means may be movable with the shear blades, with simple and reliable adjusting means operable conveniently at a place relatively remote from the heated and relatively inaccessible space in which such charge-guiding means function to adjust the charge-guiding means during the continued operation of the feeder for use at different times with mold charges of different diameters or sizes in cross-section or to meet different service conditions when charges of the same diameter or different diameters are being severed.

A further object of the invention is to provide charge-steadying and guiding means of the type described with adjusting mechanism having manually operable adjusting members which not only are readily accessible and conveniently manipulable but have but relatively little motion as compared with the motion of the charge-steadying and guiding means and of the associate shear blades.

Other objects and advantages of the invention will become apparent from the following description when it is considered in conjunction with the accompanying drawings, in which:

Figure 1 is a plan view, partly in section, showing improved charge-guiding means of the invention applied to the shearing mechanism of glass feeding apparatus of a well-known type of construction, the glass feeding forehearth of such apparatus and an adjacent support being shown diagrammatically by dot and dash lines, and portions of the shear blades being broken away to disclose underlying parts;

Fig. 3 is a view taken substantially along the line 3—3 of Fig. 1, showing the glass feeding forehearth and the glass discharge regulating means in considerable detail, with portions thereof broken away and other portions shown in section;

Fig. 4 is a side elevation of a portion of the structure shown in Fig. 1, the view being taken substantially along the line indicated at 4—4 in Fig. 1; and Fig. 5 is a fragmentary detail view, partly in section and as seen from the line 5—5 of Fig. 1, showing the means for adjustably supporting the base of one of the charge-guiding members.

According to the present invention, a pair of arcuate cooperating charge-guiding members may be supported for movement with overlapping shear blades of shear mechanism of a glass feeder to which the invention has been applied. These guiding members then will move with the shear blades to and from position to embrace each suspended mold charge at or about the time of completion of its severance, will prevent "batting" of the charge by the action of the lowermost shear blade at the time of the severing operation, and will steady and guide the severed charge as it starts to move downward toward an underlying mold or delivery device. To this end, the charge-guiding members may be carried by levers which are mounted on the shear carrying arms. Suitable means, located at a place conveniently accessible and relatively remote from the place at which the charge-guiding members function, are provided for adjusting these levers with respect to the shear arms to adjust the glass contacting faces of the charge-guiding members relatively to the cutting edges of the shear blades. This will adjust the distance between the opposed cooperative glass contacting faces of the charge-guiding members when the shear blades sever a glass charge and will permit the same glass charge-guiding members to be used at different times to steady and guide charges of different diameters. The parts which are to be manipulated in order to adjust the levers which carry the charge-guiding members are so connected with the levers as to be practically stationary or to have but relatively slight and slow movements as the levers swing back and forth with the shear arms.

Figure 1:
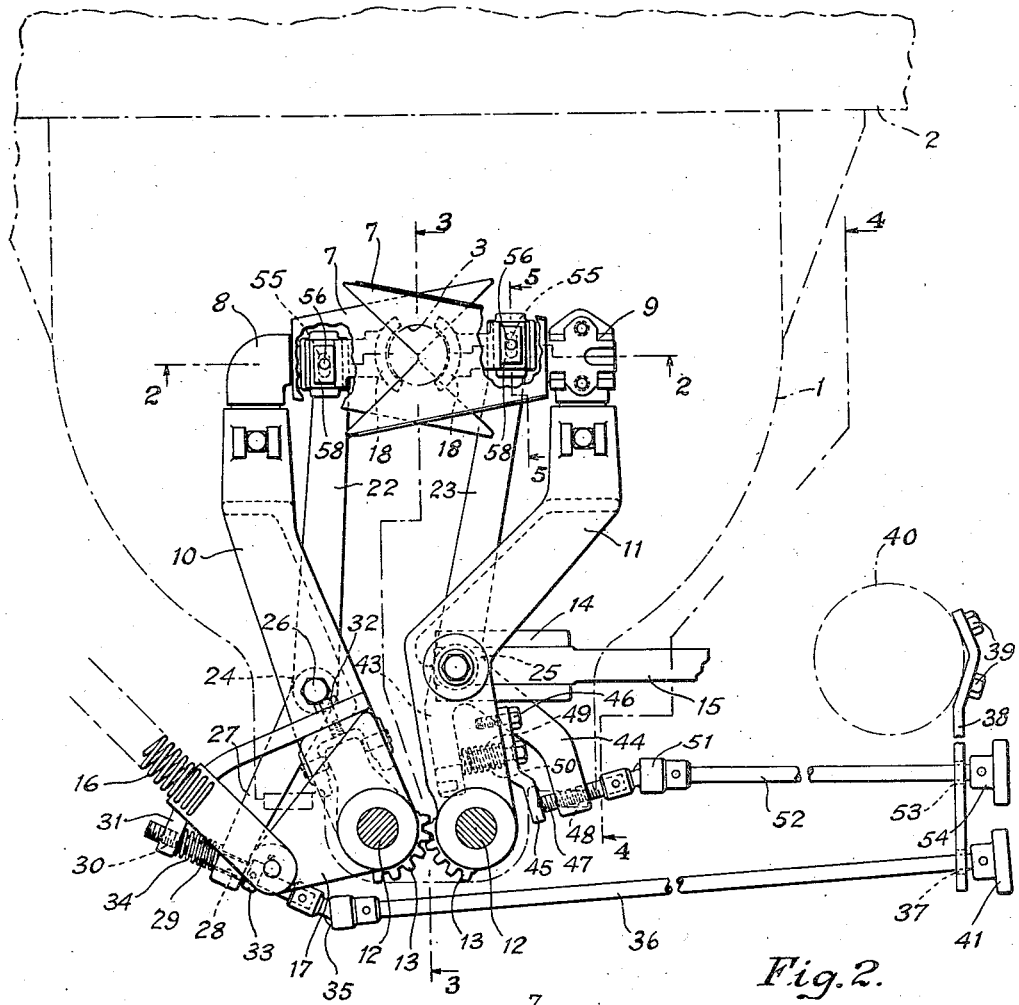

Referring now to the drawings, and particularly to Figs. 1 and 3, a practical embodiment of the invention is shown applied to a glass feeding apparatus having a forehearth 1 appurtenant to a glass melting tank or furnace, indicated at 2. The forehearth 1 has a discharge outlet 3 at the lower end of a well 4 in its base. Discharge of glass through the outlet 3 for the formation of successive suspended mold charge masses may be controlled by a reciprocating plunger 5. The flow of glass to the well 4 may be regulated by a sleeve 6 which surrounds the plunger 5 and has its lower end spaced from the upper end of the well.

The severing mechanism of the glass feeding apparatus comprises a pair of shear blades 7 of the V-shaped type. The lower and upper shear blades, respectively, are carried by holders 8 and 9, Fig. 1, which in turn are secured to the ends of shear arms 10 and 11, respectively. The shear arms 10 and 11 are mounted on vertical shafts 12 for swinging movements about the axes of such shafts, as required to close the shear blades periodically to cut charges from glass that has issued from and is in suspension below the outlet 3, the severance of such charges being effected at a plane spaced below the outlet. The pivoted end portions of the arms 10 and 11 may be suitably connected with segmental gears 13 so that swinging movement of one of the arms 10 and 11 will occasion swinging movement of the other arm to the same extent but in the opposite direction.

One of the shear arms, as the arm 11, may be connected by a universal joint 14 with a link or operating rod 15 to which motion may be imparted from a cam (not shown) or from any other suitable mechanism so as to effect oscillation of such arm about the axis of its supporting shaft 12. Such swinging movement of the arm 11 will, of course, result in a swinging movement of the arm 10 in the opposite direction. Preferably, the swinging movements of the arms 10 and 11, as a result of actuation of the arm 11 by the member 15, will effect opening of the shear blades while the closing of the shear blades is effected as a result of the action of a spring 16 which is connected to an outstanding arm or ear 17 on the shear arm 10. The spring 16 under sufficient tension when the shear arms are moved apart by the member 15 to effect desired closing movement of the shear blades as soon as the movement of the member 15 will permit.

The shearing mechanism and the other parts of the feeding apparatus which have been described so far are substantially as included in the Hartford single feeder, shown in the aforesaid Peiler patent, Serial No. 1,760,435, and are well known in the glass feeding art. Such feeding apparatus and the shearing mechanism thereof include many adjustments and operating parts which are not shown in the drawings of the present application and need not be described herein as they form no part of the present invention.

Figure 2:
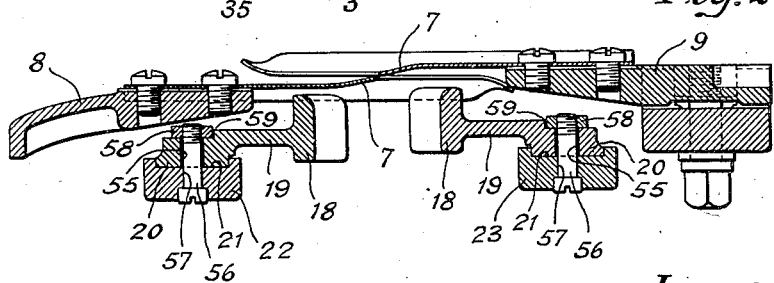
Fig. 2 is a relatively enlarged vertical sectional view, taken through the shear blades, their holders, and the charge guides of the present invention, the view being substantially along the line 2—2 of Fig. 1.

In carrying out the present invention, a pair of charge-guiding members 18 preferably are provided. These charge-guiding members may be identical with each other. Each preferably is formed to be arcuate in horizontal sectional configuration, as shown by dotted lines in Fig. 1, so that the working or glass contacting faces thereof will conform in configuration to the surfaces of the glass charges with which they are to be used. The guides 18 may have substantially horizontal shanks 19, the outer end portions of which are merged into bases 20 of block-like form. The bases 20 have their lower portions formed to fit slidably in longitudinally extending grooves 21 in the upper surfaces of the free end portions of swinging arms 22 and 23 of bent levers which are indicated generally at 24 and 25, respectively. The lever 24 is that which carries the guide 18 for the lowermost shear blade while the lever 25 carries the guide 18 for the uppermost shear blade, as will be clear from Figs. 1 and 2.

The lever 24 is fulcrumed on a vertical pivot member, which may be a depending stud or bolt 26 that is carried by the shear arm 10, Figs. 1 and 3. The lever 24 thus is disposed below the level of the shear arm 10. The pivot member 26 is provided with suitable washers or other bearing members to space the lever 24 from the arm 10 and to obviate any objectionable friction as the lever 22 is swung about the axis of its supporting pivot member.

The lever 24 also has a relatively short arm, indicated at 27, extending at an obtuse angle with the arm 22 from the fulcrum point of the lever. This arm 27 is transversely apertured at 28 adjacent to its outer end. An adjusting rod has a section 29 extending slidably and loosely through the aperture 28. The section 29 of the adjusting rod has screw threads and is threaded through an opening 30 in an abutment plate 31. The abutment plate is fixed, as by screw 32, to the shear arm 10. A stop collar 33 on the section 29 of the adjusting rod is located at the side of the lever arm 27 opposite to the abutment plate 31 and limits the extent of sliding movement of the member 29 in one direction through the aperture 28. An expansion spring 34 is coiled about the member 29 between the abutment plate 31 and the lever arm 27 and urges the lever arm against the collar 33. Such collar may have a rounded bearing face abutting the adjacent side of the arm 27.

A universal joint 35 connects the section 29 of the adjusting rod with a relatively long section 36 of such rod. The section 36 extends slidably and loosely through an aperture 37 in a supporting and guiding plate 38. The latter may be secured, as by the cap screws 39, to any convenient stationary support, such as that indicated diagrammatically at 40 in Fig. 1. A hand wheel 41 is provided at the outer end of the section 36 of the adjusting rod so that such adjusting rod may be conveniently turned about its longitudinal axis to effect adjustment of the lever 24 with respect to the shear arm 10. This will effect adjustment of the distance between the inner or glass contacting surface of the associate guide 18 and the extended axial or center line of the outlet 3 when the shear blades are in closed position.

The lever 25 is supported from the shear arm 11 through the agency of a depending pivot stud or bolt 42, as best seen in Fig. 4. The pivot stud or bolt 42 is provided with suitable washers or other bearing members whereby the lever 25 is spaced below the arm 11 and may be swung about the axis of the member 42 when it is desired to adjust the lever 25 with respect to the shear arm 11.

The shorter or motion receiving arm of the lever 25 is bifurcated and comprises the branches 42 and 44, Fig. 1. The branch 44 has its outer end portion disposed in confronting relation to a depending portion of an abutment plate 45. The latter is secured, as by cap bolts 46, to the inner or pivoted end portion of the shear arm 11. A section 47 of an adjusting rod has screw threads and is threaded through a transverse opening 48 in the outer end portion of the branch 44 of the shorter arm of the lever 25. The plate 45 is located approximately midway between the branches 43 and 44 of said lever arm. An expansion spring 49 bears at one end against a portion of the abutment plate 45 and at its other end against the branch 43 of said lever arm and thus tends to maintain the end of the section 47 of the adjusting rod against the abutment plate 45, as clearly shown in Fig. 1. This expansion spring 49 is retained in place by a projection 50 that extends from the plate 45 toward the member 43 and is encircled by a portion of the spring 49.

The section 47 of the last named connecting rod is connected by a universal joint 51 with a relatively long section 52 of that adjusting rod. The member 52 extends slidably and loosely through an opening 53 in the plate 38 and is provided at its outer end with a hand wheel 54, whereby the adjusting rod 52—51—47 may be conveniently turned to adjust the length of the portion of the section 47 thereof between the lever arm branch 44 and the abutment plate 45. It is obvious that turning of this last-named adjusting rod will effect swinging movement of the lever 25 about its fulcrum with respect to the lever arm 11 and thus will adjust the distance between the inner or glass contacting face of the associate guide 18 and the extended axial or center line of the outlet 3 when the shear blades are in their glass severing position, as shown in Fig. 1.

By referring to Fig. 1, it will be noted that the motion connections between the adjusting rods and the levers 24 and 25 are with the relatively short arms of such levers and moreover are located relatively close to the pivoted ends of the shear arms 10 and 11. Therefore, the bodily movement of the levers as the shear arms swing back and forth for successive glass severing operations will cause but relatively little movement of the adjusting rods. Such movement also will be relatively slow as compared with the speed of movement of the shear blades and of the charge guides. This makes for ease of manipulation of the hand wheels 41 and 54 while the shearing mechanism and the guides are in operation.

It also will be noted that any angular adjustment of the shorter arm of either of the levers with respect to the shear arm by which that lever is carried will result in a relatively greater adjustment of the guide carrying end of that lever with respect to the shear blade carrying end of the shear arm. This permits any desired adjustment of either of the guides with respect to its associate shear blade to be effected with but relatively little manipulation of the adjusting rod for that guide.

In addition to the adjustment of the guides 18 to vary the distance between the glass contacting faces thereof when the shear blades are closed, the invention preferably provides for adjustment of the guides longitudinally of the end portions of their supporting lever arms. This last named adjustment is to dispose the charge guides so that the glass contacting faces thereof will be located symmetrically about the extended axial or center line of the glass discharge outlet when the shears are closed. In other words, such adjustment is to insure uniform contact with the glass charge mass that has issued from the outlet of all portions of the glass contacting faces of the guides. To this end, the bases 20 of the shanks of the charge guides are provided with vertical openings 55 which are elongated in the direction of length of the shear arms, Figs. 1 and 5. Bolts 56 extend through vertical openings 57 in the supporting end portions of the lever arms and through the elongated openings 55 and threadedly engage nuts or retaining blocks 58. The latter rest on the upper surfaces of the bases 20 of the shanks of the charge guides and preferably have straight lateral faces in contact with lateral shoulders 59 on the charge guides. It therefore is obvious that when the bolts 56 have been tightened, the charge guides will be held firmly in place on the end portions of the relatively long arms of the levers 24 and 25. The contact of the straight lateral faces of the nuts or blocks 58 with lateral shoulders on the charge guides tend to prevent accidental displacement or loosening of the charge guides and also aid in producing a firm, although releasable, connection between the lever arms and the shanks of the charge guides when the bolts 56 have been tightened. When the bolts 56 have been loosened, the entire charge guides may be slid along the guides or grooves 21 and thus adjusted within limits along the guideways 21.

From the foregoing description of the various parts of the illustrated embodiment of the invention, the operation thereof may be readily understood. With the glass feeding outlet 3 at a given distance from the vertical shafts 12 on which the shear arms are pivoted, the charge guides are adjusted along the relatively long arms of the levers 24 and 25 until such guides are in position to be concentric with the extended axial or center line of the outlet when the shear arms have been swung to position to close the shear blades. The bolts 56 then are tightened to secure these charge guides firmly to their supporting lever arms. This adjustment preferably is effected before the operation of the feeder is commenced or during a period of cessation of operation.

The operation of the feeder and of the shearing mechanism then may be commenced. During such operation, the hand wheels 41 and 54 may be manipulated to adjust the charge guides toward each other until they are in such positions with respect to the cutting edges of their associate shear blades that they will embrace and contact with opposite sides of a mold charge mass of a given diameter at or about the time of completion of each severing operation. When the size of the mold charge to be obtained is changed, further adjustment of the guides toward or away from each other may be required, as when the diameter of the portion of the mold charge mass that is embraced by such mass is changed. Such adjustment may be effected conveniently and accurately during the continued operation of the feeder and of the shearing mechanism and while the effects of the adjustments which are made by turning the hand wheel 41 and 54 may be observed. This obviates the necessity of discontinuing the operation of the feeder and of the shearing mechanism for such adjustments, as heretofore has been necessary when the charge guides are carried by or mounted for movement with the shear blades.

The adjustment just described also may be required by a change in the conditions of the service in which the guides are used, as by a change of overlap of the shear blades or of the throw of the shear blades as they move to their overlapping glass severing position, even though the diameter of the mold charges may not have been changed. Such adjustment may be attended by a slight change, in respect to the instant of severance of the charge, of the time at which the guides move to their operative glass charge contacting positions but such change of time will not be sufficient to impair the efficiency of the guides in performing their intended and hereinbefore described function.

While two of the charge guides preferably are employed in association with both of the overlapping shear blades and in confronting relation with each other, as shown, it is obvious that good results may be obtained when the charge guide for the lower shear blade and the adjusting and supporting mechanism for such guide are omitted. In that event, the guide which is mounted for movement with the uppermost shear blade will oppose the "batting" tendency of the lower shear blade and may be adjusted with respect to its associate shear blade by its own particular mechanism, in the manner hereinbefore described.

It is to be understood that many features of the hereinbefore described practical embodiment of the invention may be modified and changed to meet various service requirements and varying conditions without departing from the spirit and scope of the invention. The invention, therefore, is not to be restricted beyond the clear meaning of the terms of the appended claims.

I claim:

1. In apparatus for feeding molten glass from a downwardly opening outlet, the combination with means having rapidly recurring cycles of movement for periodically severing mold charges from glass that has issued from said outlet, of a pair of cooperative charge guides, means for mounting and operating said guides to cause them to move with said severing means and effective to move said guides periodically to operative positions in contact with opposite sides of each of successive charges for steadying each charge at the time of its severance and to retract the guides from their operative positions in the intervals between successive charge severing operations, and adjusting means having only relatively slight and comparatively slow movements as compared with the movements of the guides, so as to be operable during the continued operation of said severing means and said guides for adjusting said guides independently of adjustment of the severing means to vary the distance between said guides when they are at their operative positions, whereby said guides may be used at different times to contact with and steady charges of different diameters.

2. In apparatus for feeding molten glass from a downwardly opening outlet, the combination with severing mechanism comprising a pair of cooperative shear blades movable into overlapping relation periodically to sever mold charges from glass that has issued downwardly from said outlet, of a pair of charge guides, means supporting said charge guides for movement with said shear blades to and from positions to contact with opposite sides of each mold charge for steadying that charge at the time of its severance, and adjusting means connected with the supporting means for said guides and having only relatively slight and comparatively slow movements as compared with the movements of the guides so as to be operable at a substantial distance from said guides during the continued operation of said shear blades and said guides for adjusting said guides with respect to said shear blades to vary the distance between the guides when the shear blades are closed.

3. In glass feeding apparatus, the combination with shearing mechanism comprising a pair of shear blades movable periodically to overlapping relation for severing mold charges from molten glass that has issued downwardly from a discharge outlet, of a pair of charge guides, means for supporting said guides for movement with said shear blades to positions to substantially embrace each mold charge below the severing plane at the time of severance of such charge by the overlapping shear blades, and adjusting means connected with said supporting means and having only relatively slight and comparatively slow movements as compared with the movements of the guides so as to be operable at a substantial distance from the place of operation of the guides for independently adjusting each of said guides with respect to said shear blades during the continued operation of said guides and said shear blades.

4. In glass feeding apparatus, the combination with a pair of cooperative shear blades and pivoted shear arms carrying said blades and oscillated to move said blades periodically to overlapping relation below a glass discharge outlet to sever mold charges from glass that has issued downwardly from said outlet and to retract the shear blades in the intervals between successive severing operations, of a pair of charge guides, levers carried by said shear arms and supporting said guides for movement with the shear blades to bring said guides to positions to contact with opposite sides of each mold charge for steadying that charge at the time of its severance by the shear blades and to retract the guides with the shear blades in the intervals between successive severing operations, adjustable connections between said levers and their supporting shear arms, and adjusting means having only relatively slight and comparatively slow movements as compared with the movements of the guides so as to be operable at a substantial distance from the place of operation of said guides and during the operation of said guides for adjusting said adjustable connections to vary the distance between said guides when said guides have been moved to their said glass contacting operative positions, said adjustment of said guides being independent of adjustment of the overlapping relation of said shear blades.

5. In glass feeding apparatus, the combination with a pair of cooperative shear blades and pivoted arms supporting said shear blades, said arms being swingable toward and away from each other periodically to close the shear blades below and in line with a glass discharge outlet to sever mold charges from glass that has issued downwardly from said outlet, a pair of levers having fulcrums carried by said shear arms, said levers having end portions located below and adjacent to said shear blades and having their opposite end portions extending to positions adjacent to the pivoted ends of said shear arms, charge guides carried by the first named end portions of said levers, adjustable connections between the second named end portions of said levers and the adjacent portions of said shear arms, and manually operable means connected with said adjustable connections for adjusting said levers with respect to said shear arms during the continued operation of said shear arms, whereby the operative positions of the guides may be varied independently of adjustment of said shear blades.

6. In glass feeding apparatus, the combination with a pair of cooperative shear blades and pivoted arms carrying said shear blades and oscillated to close said shear blades periodically to sever mold charges from glass that has issued downwardly from a glass discharge outlet and to retract the shear blades in the intervals between successive severing operations, of a pair of guides for steadying the charges at the time of their severance by said shear blades, levers carrying said guides and having their fulcrums supported by said shear arms so as to cause said guides to be moved to operative charge steadying positions as the shear blades are closed to sever the charges, connections between said guides and said levers whereby said guides may be adjusted longitudinally of said levers, and adjustable connections between said levers and said shear arms of such a nature that said levers may be swung relatively to said shear arms to adjust the operative positions of said guides to steady mold charges of different diameters at different times, said adjustable connections between said levers and said shear arms being of such character as to be operable during the swinging movements of said shear arms and the continued operation of said guides and said shear blades.

7. In glass feeding apparatus, the combination with a pair of cooperative shear blades and pivoted arms carrying said shear blades and oscillated to close said shear blades periodically to sever mold charges from glass that has issued downwardly from a glass discharge outlet and to retract the shear blades in the intervals between successive severing operations, of a pair of guides for steadying the charges at the time of their severance by said shear blades, levers carrying said guides and having their fulcrums supported by said shear arms, whereby said guides will be moved to operative charge steadying positions as the shear blades are closed to sever the charges, adjustable connections between said guides and said levers whereby said guides may be adjusted longitudinally of said levers, adjustable connections between said levers and said shear arms, whereby said levers may be swung relatively to said shear arms to adjust the operative positions of said guides with respect to each other to steady mold charges of different diameters at different times, and adjusting rods connected with said second-named adjustable connections, said adjusting rods extending to a place conveniently accessible to an operator of said feeding apparatus and being operable at that place to adjust said second-named adjustable connections for varying the operative positions of said guides during the continued operations of said guides and of said shearing mechanism.

8. In glass feeding apparatus, the combination with shearing mechanism comprising a pair of shear blades and pivoted shear arms carrying said blades, said shear arms being oscillated to close the shear blades periodically to effect severance of mold charges from molten glass that has issued downwardly from a discharge outlet and to retract the shear blades in the intervals between successive severing operations, of bent levers having their fulcrums carried by said shear arms at points on said arms nearer to the pivoted ends of the arms than to the portions thereof on which the shear blades are carried, said levers having relatively long arms extending to the proximity of the shear blades at a level below said shear blades, charge guides carried by said relatively long arms of said levers in position for contacting with opposite sides of each mold charge to steady said charge at the time of its severance by the closed shear blades, said levers having shorter arms extending adjacent to the pivotally supported ends of said shear arms, adjustable motion transmitting connections between said shorter arms of said levers and the adjacent portions of said shear arms, and adjusting rods connected with said adjustable connections for adjusting them to swing said levers angularly about their fulcrums with respect to said shear arms and thereby to adjust the distance between said guides when the guides are in their operative charge steadying positions, said rods being of substantial length and extending to a place conveniently accessible for manipulation by an operator of said feeding apparatus, the movement of said rods as said shear arms oscillate being relatively slight in extent and of slow speed as compared with the movements of the guides and shear blades.

9. In glass feeding apparatus, the combination with a pair of cooperative shear blades and pivoted shear arms carrying said blades for moving them periodically to overlapping relation for severing mold charges from molten glass that has issued downwardly from a discharge outlet and for retracting the shear blades in the intervals between successive severing operations, of a lever having its fulcrum supported by the shear arm for the uppermost of the overlapping shear blades, said lever having an end portion located below and adjacent to said uppermost shear blade and having its opposite end portion extending to a position adjacent to the pivoted end of its supporting shear arm, a charge guide carried by the first-named end portion of said lever for contacting with each mold charge at the time of severence of said charge to oppose the tendency of the lower shear blade to displace the upper end of the severed charge in a lateral direction, an adjustable connection between the second-named end portion of said lever and its supporting shear arm, and manual means connected with said adjustable connection and operable during the continued operation of said shear blades and of said guide to adjust said adjustable connection for varying the operative position of said charge guide independently of a change of the operative position of its associate shear blade.

10. Glass feeding apparatus comprising means for suspending a charge of molten glass, severing means including a pivotally mounted blade for severing the suspended charge, a charge guide, adjustable means for mounting the guide so that it will move with the pivotally mounted blade and may be adjusted relatively to the blade, and adjusting means including a manually operable member connected with the guide mounting means near the pivot of the pivotally mounted shear blade so that a given swinging movement of said blade about the axis of its pivot will cause only a relatively slight and relatively slow movement of said manually operable member as compared with the movement of the guide whereby said manually operable member may be conveniently grasped and manipulated during continued movement of the guide with the shear blade.

WILLIAM T. BARKER, Jr.